(12) United States Patent
Wang et al.

(10) Patent No.: US 8,475,898 B2
(45) Date of Patent: Jul. 2, 2013

(54) POLYOLEFIN RESIN BLENDS FOR CRACK-RESISTANT PIPE

(75) Inventors: Shaotian Wang, Mason, OH (US); Gregory G. Hlatky, Morrow, OH (US); Sebastian Joseph, Mason, OH (US); Jean A. Merrick-Mack, West Chester, OH (US); Kenneth J. Klug, Cincinnati, OH (US); Wallace W. Yau, Pearland, TX (US)

(73) Assignee: Equistar Chemicals, LP, Houston, TX (US)

( * ) Notice: Subject to any disclaimer, the term of this patent is extended or adjusted under 35 U.S.C. 154(b) by 1142 days.

(21) Appl. No.: 11/897,438

(22) Filed: Aug. 29, 2007

(65) Prior Publication Data

US 2009/0061135 A1 Mar. 5, 2009

(51) Int. Cl.
*B32B 1/08* (2006.01)
*C08L 23/06* (2006.01)

(52) U.S. Cl.
USPC .......... 428/36.9; 428/36.92; 525/240

(58) Field of Classification Search
USPC .......... 428/36.9, 36.92, 35.7; 525/209, 525/240
See application file for complete search history.

(56) References Cited

U.S. PATENT DOCUMENTS

| 4,464,518 | A | 8/1984 | Iwabuchi et al. | 526/127 |
|---|---|---|---|---|
| 4,927,797 | A | 5/1990 | Ewen | 502/127 |
| 6,211,311 | B1 | 4/2001 | Wang et al. | 526/131 |
| 6,232,260 | B1 | 5/2001 | Nagy et al. | 502/155 |
| 6,433,095 | B1 * | 8/2002 | Laurent | 525/240 |
| 6,559,251 | B1 | 5/2003 | Wang et al. | 526/127 |
| 6,642,326 | B1 * | 11/2003 | Meyer et al. | 526/134 |
| 6,818,713 | B1 | 11/2004 | Wang et al. | 526/161 |
| 6,838,410 | B2 | 1/2005 | Wang et al. | 502/103 |
| 6,867,278 | B2 | 3/2005 | McDaniel et al. | 526/348.5 |
| 6,908,972 | B2 | 6/2005 | Tsuie et al. | 526/160 |
| 6,933,353 | B2 | 8/2005 | Wang | 526/114 |
| 2002/0095014 | A1 * | 7/2002 | Fottinger et al. | 526/125.3 |

FOREIGN PATENT DOCUMENTS

| EP | 1 460 105 | * | 3/2003 |
|---|---|---|---|
| WO | WO99/24446 | | 5/1999 |

OTHER PUBLICATIONS

J. Scheirs et al., "PE100 Resins for Pipe Applications: Continuing the Development into the 21st Century." *TRIP* 4, Dec. 1996, 408-415.
Stadler, et al., *Macromolecules* 2006, 39, 1474-1482.
Shroff et al., *Macromolecules* 2001, 34, 7362-7367.
Shroff et al., *J. Appl. Poly. Sci.* 57 (1995) 1605.
Harrell et al., *J. Appl. Polym. Sci.* 29 (1984) 995.
Han et al., *Polym. Eng. Rev.* 2 (1982) 135.

* cited by examiner

*Primary Examiner* — Erik Kashnikow

(57) ABSTRACT

Resin blends useful for pipe and blow-molded articles are disclosed. The blends comprise a low-molecular-weight, high-density polyethylene and a high-molecular-weight, low-density ethylene copolymer. The high-molecular-weight component is made with a bridged indenoindolyl Group 4 metal complex having open architecture. Blends of the invention uniquely have high molecular weight ($M_w$>200,000) and low levels of long-chain branching. A quick, convenient approach for estimating levels of long-chain branching in polyethylenes from gel permeation chromatography and dynamic oscillatory rheometry ("viscosity enhancement factor") is disclosed.

7 Claims, No Drawings

POLYOLEFIN RESIN BLENDS FOR CRACK-RESISTANT PIPE

FIELD OF THE INVENTION

The invention relates to polyolefin resin blends useful for making pipes and blow-molded articles, and to an improved way to characterize the amount of long-chain branching in ethylene polymers.

BACKGROUND OF THE INVENTION

Traditional Ziegler-Natta catalysts for olefin polymerization have dominated the landscape for decades, but a newer generation of single-site catalysts is gradually gaining acceptance. While single-site catalysts can provide polyolefins with superior physical properties, these advantages often come at the expense of reduced processability, high cost, or other tradeoffs. Thus, Ziegler-Natta catalysts remain important industry staples.

Indenoindolyl transition metal catalysts are single-site catalysts with remarkable versatility (see e.g., U.S. Pat. Nos. 6,232,260 and 6,908,972). The ligands are easy to synthesize and incorporate into complexes useful for making HDPE, LLDPE, plastomers, polypropylene, and other polyolefins. A continuing challenge with single-site catalysts generally and indenoindolyl catalysts in particular, however, is how to make resins that have both high molecular weight and a relatively low level of long-chain branching. Unbridged indenoindolyl catalysts provide ethylene polymers with the desired low level of long-chain branching, but the molecular weight is often lower than necessary for a particular application; a fractional melt index is difficult to obtain. In contrast, the bridged catalysts provide high enough molecular weight, but normally with considerable long-chain branching.

Recently, we observed that certain indenoindolyl complexes having "open architecture" (see U.S. Pat. Nos. 6,559,251 and 6,838,410) uniquely provide both high molecular weight and a low level of long-chain branching, and we wondered how best to take advantage of the attribute. Initial investigation of films made with these catalysts provided mixed results.

Resins from single-site catalysts are not commonly used for non-film applications such as pipe or blow-molded articles, and it is unclear how resin attributes such as long-chain branching might impact key properties for these applications. One commercial pipe resin, for instance, is a high-molecular-weight Ziegler-Natta resin, Equistar's L5008. This single resin provides pipe with good environmental stress crack resistance, but there is always room for improvement.

Bimodal high-density polyethylene grades having particular value for high-stiffness pipe applications are known (see J. Scheirs et al., "PE100 Resins for Pipe Applications: Continuing the Development into the 21st Century," *TRIP* 4, December 1996, 408-415). The authors explain that commercial PE100 resins are HDPE grades "characterized by exceptionally high environmental stress crack resistance, good resistance to rapid crack propagation (RCP), and very high creep resistance." The reference teaches the importance of concentrating short-chain branches in the high molecular weight fraction of the polymer chain distribution, and it further teaches tandem reactor systems or dual-site catalysts to achieve that effect. Not specifically taught, however, is how to select catalysts capable of achieving an acceptable PE100 resin. The reference is also silent regarding the importance of limiting the amount of long-chain branching in the resin.

U.S. Pat. No. 6,867,278 teaches a way to make a single resin useful for high-stiffness pipe. The resin is made in a slurry-loop reactor using a chromium catalyst on a fluoridated aluminophosphate support. The catalyst is believed to generate a high-molecular-weight ethylene copolymer having little or no long-chain branching (see col. 13). The '278 patent characterizes bimodal resins as having "excellent toughness" but "deficient when pipe is formed by extrusion under certain conditions" (see col. 1, ll. 37-50).

Characterizing long-chain branching in polyolefins presents yet another challenge. Numerous methods have been proposed, including NMR and more complicated combinations of techniques, such as that proposed by Stadler et al. (*Macromol.* 39 (2006) 1474), which combines melt-state NMR, size-exclusion chromatography, multiangle laser light scattering, and linear viscoelastic shear rheology. Earlier, Shroff and Mpyridis recognized that a long-chain-branching index ("LCBI") could be inferred from rheology data, including the measured intrinsic viscosity, a solution viscosity measurement, and the estimated zero-shear melt viscosity (*Macromol.* 34 (2001) 7362). Unfortunately, the known techniques are less useful for polymers with high molecular weight because evaluating the zero-shear viscosity ($\eta_o$) for such polymers becomes prohibitively difficult at high enough molecular weights.

In sum, the polyolefins industry would benefit from improved ways to characterize the amount of long-chain branching in olefin polymers, preferably without the need to devise a complex, new analytical method or instrument. Additionally, the industry needs resins and resin blends that can provide non-film articles such as pipe and blow-molded articles with enhanced properties. The industry would also benefit from finding ways to capitalize on the unique properties of resins made using indenoindolyl catalysts, particularly resins that have both high molecular weight and a limited content of long-chain branching.

SUMMARY OF THE INVENTION

In one aspect, the invention is a resin blend. The blend comprises a low-molecular-weight, high-density polyethylene and a high-molecular-weight, low-density ethylene copolymer produced using a bridged indenoindolyl Group 4 metal complex having open architecture. The blend has a density from 0.94 to 0.96 g/cm$^3$, a weight-average molecular weight ($M_w$) determined by conventional gel permeation chromatography (GPC) calculations greater than 200,000, and a viscosity enhancement factor (VEF), calculated from its melt viscosity ($\eta^*$) at 190° C. and 0.025 radians per second, of less than 2. We surprisingly found that resin blends of the invention provide pipes with excellent stress crack resistance. Moreover, the improvement may be linked to a relatively low level of long-chain branching in the high-molecular-weight ethylene copolymer.

The invention includes a method (the "VEF method") for estimating the amount of long-chain branching in an ethylene polymer. This method compares the melt viscosity of a polymer sample measured at a fixed frequency <0.05 rad/sec with that of a linear ethylene polymer having a molecular weight identical to that of the sample. It was shown using a series of linear ethylene polymers of varying molecular weights that a linear correlation exists between such a low-shear rate viscosity and the measured $M_w$, similar to the relationship between zero-shear viscosity and $M_w$. Therefore, deviations from the linear behavior suggest the presence of long-chain branching. VEF is exactly 1 for a linear polymer having no long-chain branching. VEF greater than 1 indicates the presence of long-chain branching, i.e., the presence of one or more long-chain branches on an otherwise linear polymer backbone. The method combines two well-established, simple techniques—gel permeation chromatography and dynamic oscillatory rheometry—to rapidly and easily generate evidence of the presence or absence of long-chain branching in an ethylene polymer.

DETAILED DESCRIPTION OF THE INVENTION

Resin blends of the invention comprise, as one component, a low-molecular-weight, high-density polyethylene. The amount of low-molecular-weight HDPE in the blend is within the range of 30 to 70 wt. %, preferably 40 to 60 wt. %. The HDPE component preferably has a density within the range of 0.960 to 0.975 g/cm³, more preferably from 0.965 to 0.975 g/cm³. The HDPE component also has a low molecular weight relative to that of the high-molecular-weight ethylene copolymer. In particular, the HDPE component preferably has a weight-average molecular weight less than 100,000, more preferably within the range of 20,000 to 60,000. The HDPE component preferably has a melt index ($MI_2$) greater than 50, more preferably greater than 100, and most preferably within the range of 100 to 500.

The low-molecular-weight, high-density polyethylene is preferably produced using a siloxane-supported Ziegler-Natta catalyst. Suitable catalysts of this type are described, for example, in U.S. Pat. No. 4,464,518, the teachings of which are incorporated herein by reference. Several steps are normally involved in preparing siloxane-supported Ziegler-Natta catalysts (see Example 1, below).

In a preferred approach to making siloxane-supported Ziegler-Natta catalysts, a Grignard reagent (e.g., n-butylmagnesium chloride) is first reacted with a siloxane polymer (e.g., a silyl-terminated methylhydropolysiloxane) in a suitable solvent (e.g., tetrahydrofuran) to make product (A). Separately, a reaction product of a dialkylaluminum halide and one or more alcohols (e.g., a mixture of 1-hexanol and cyclohexanol), preferably in the presence of a hydrocarbon diluent (e.g., toluene) is prepared (product (B)). Products (A) and (B) are then combined to produce (C), which is combined with titanium tetrachloride and worked up as described in the '518 patent to provide (D), a polysiloxane-supported titanium pre-catalyst. Combination of (D) with a trialkylaluminum (e.g., triethylaluminum) as described previously gives the polysiloxane-supported Ziegler-Natta catalyst.

The method for preparing the low-molecular-weight, high-density polyethylene is not critical. It is produced using conventional gas-phase, slurry, bulk, or solution polymerization methods. In one convenient approach, the low-molecular-weight component is made in two parallel slurry-tank reactors operating under the same conditions. Each reactor is charged with a polysiloxane-supported Ziegler-Natta catalyst, alkylaluminum cocatalyst, hydrocarbon diluent (e.g., hexane), ethylene, and hydrogen. The reactor pressure is adjusted to <160 psig by controlling the rate of catalyst and cocatalyst addition. After about 2 h, the resulting polyethylene slurry is transferred to a flashdrum in which ethylene and hydrogen are stripped and recycled to the reactors. The polyethylene is then separated from hexane diluent and dried. Example 9, below, shows another approach to making the low-molecular-weight HDPE.

The low-molecular-weight HDPE is preferably made in the presence of a silane modifier. The silane modifier helps to keep the molecular weight distribution of this resin component reasonably narrow ($M_w/M_n$<5) Preferred silane modifiers are dialkoxy(alkyl)silanes, more preferably cyclohexyl dialkoxy(alkyl)silanes. Examples include cyclohexyl dimethoxy(methyl)silane, cyclohexyl dimethoxy(ethyl)silane, cyclohexyl diethoxy(ethyl)silane, and the like. Additional suitable silane modifiers are described in U.S. Pat. No. 4,927,797, the teachings of which are incorporated herein by reference.

A second component of the resin blend is a high-molecular-weight, low-density ethylene copolymer. The amount of copolymer in the blend is within the range of 30 to 70 wt. %, preferably 40 to 60 wt. %. The copolymer component preferably has a density within the range of 0.890 to 0.935 g/cm³, more preferably from 0.900 to 0.925 g/cm³. The ethylene copolymer component has a high molecular weight relative to that of the low-molecular-weight, high-density polyethylene component. In particular, the high-molecular weight, low-density copolymer preferably has a weight-average molecular weight greater than 100,000, preferably within the range of 50,000 to 5,000,000, and more preferably within the range of 150,000 to 500,000. Additionally, the ethylene copolymer component has little or no long-chain branching content. Thus, the viscosity enhancement factor (VEF) does not deviate significantly from unity.

The high-molecular-weight, low-density ethylene copolymer is produced using a bridged indenoindolyl Group 4 metal complex having open architecture. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. Suitable indenoindolyl catalysts having open architecture and methods for making them are disclosed in U.S. Pat. Nos. 6,559,251 and 6,838,410, the teachings of which are incorporated herein by reference. In preferred catalysts of this type, the indenoindolyl complex has the general structure:

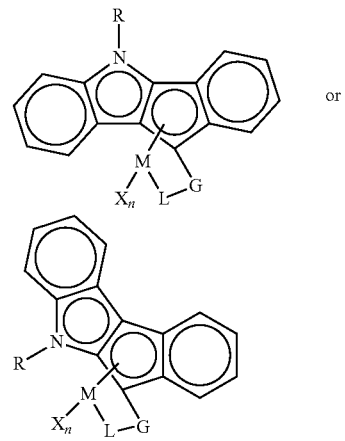

in which M is a Group 4 transition metal, G is a linking group, L is a ligand that is covalently bonded to G and M, R is alkyl, aryl, or trialkylsilyl, X is alkyl, aryl, alkoxy, aryloxy, halide, dialkylamino, or siloxy, and n satisfies the valence of M.

Open architecture indenoindolyl complexes should be distinguished from other bridged indenoindolyl complexes, which are generally not suitable for use in making the inventive resin blends. In the unsuitable complexes, the transition metal is pi-bonded to an indenyl Cp ring and is also pi-bonded to another Cp-like group. See, e.g., U.S. Pat. No. 6,232,260 or WO 99/24446. Comparative Example 3 shows a methylene-bridged bis(indenoindolyl)zirconium complex (6). Note that the Group 4 metal is pi-bonded to two Cp-like rings. In suitable complexes such as complex (5) in Example 2, the Group 4 metal is sigma-bonded to nitrogen and pi-bonded to the Cp-like group.

Preferably, the open achitecture indenoindolyl Group 4 metal complex is used with a support, preferably silicas, aluminas, titanias, silica-aluminas, aluminum phosphates, or the like. The support is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. Example 4 below shows the preparation of a methylalumoxane-treated silica support.

Supported complexes are prepared according to well-known methods. The complex and support can be combined in any desired method. Typically, a treated support is added to a solution of the open archtecture indenoindolyl complex in a hydrocarbon solvent to produce a slurry. Solvent removal provides a supported complex. An incipient-wetness method can also be used. One convenient approach is illustrated by Example 5 below.

The high-molecular-weight, low-density ethylene copolymer is produced using conventional gas-phase, slurry, bulk, or solution polymerization methods. Example 7 below illustrates a suitable way to make the copolymer.

Resin blends of the invention have "medium density," i.e., they have a density within the range of 0.94 to 0.96 g/cm$^3$, more preferably from 0.945 to 0.955 g/cm$^3$. The blends have a weight-average molecular weight ($M_w$), as determined by conventional gel permeation chromatography (GPC) calculations using retention times, greater than 200,000, preferably within the range of 250,000 to 500,000, more preferably within the range of 300,000 to 400,000. The blends also have a low, limited amount of long-chain branching as indicated by a viscosity enhancement factor (VEF), calculated from the blend's melt viscosity ($\eta^*$) at 190° C. and 0.025 radians per second, of less than 2, preferably about 1. The resin blends preferably have a high-load melt index ($MI_{20}$) of less than 25, more preferably less than 15, and preferably have an $E_R$ value (rheological polydispersity) less than 1.5, more preferably less than 1.2.

Normally, the components of the resin blends will be made separately and then combined by any suitable means. In one convenient approach, the resins are made in parallel slurry-tank reactors, and the products are blended together immediately after preparation. However, the resins do not need to be made at the same time or as part of the same process. As shown in Example 10, below, it may be desirable to combine the components in a way that produces a targeted product density that is intermediate between the densities of the individual components.

The invention includes a pipe produced from a resin blend of the invention. In addition to the resin blend, the pipe may incorporate other conventional components, including, for example, fillers, antioxidants, nucleating agents, pigments, plasticizers, or the like. Pipes made from resin blends of the invention exhibit stress-crack resistance. Preferably, the pipe will exhibit a notched constant tensile (NCTL) value of greater than 500 hours to failure (see Table 2, below). It is anticipated that similar benefits will result when the blends are utilized in the manufacture of blow-molded articles such as bottles or containers.

The invention also includes a method for estimating the amount of long-chain branching in certain ethylene polymers, particularly those having weight-average molecular weights in the range of 20,000 to 500,000. We developed the method in response to an industry need for a simple way to estimate long-chain branching, particularly in high-molecular-weight polyethylenes. The method, hereinafter called the "VEF method," compares the melt viscosity of a polymer sample measured at a fixed frequency <0.05 rad/sec with that of a linear ethylene polymer having a molecular weight identical to that of the sample. The "viscosity enhancement factor," or VEF, is defined to be exactly 1 for a polymer having no long-chain branching. VEF greater than 1 indicates the presence of long-chain branching. A value of VEF <1 can result from ethylene polymers having a more complicated branching structure, such as those produced by free-radical polymerization (e.g., some varieties of LDPE).

The method combines two well-established, simple techniques—gel permeation chromatography and dynamic oscillatory rheometry—to rapidly and easily generate evidence of the presence or absence of long-chain branching in an ethylene polymer.

The viscosity enhancement factor is calculated from:

$$VEF = \eta^* / K(M_w)^x$$

where $\eta^*$ is the melt viscosity of the sample measured at a temperature above its melting point at a fixed frequency <0.05 rad/sec, K is a constant having a value in the range of $10^{-13}$ to $10^{-15}$, $M_w$ is the weight-average molecular weight of the sample, x has a value from 3 to 4, and $K(M_w)^x$ is the melt viscosity of a linear ethylene polymer having a weight-average molecular weight equivalent to that of the sample, where K and x are determined using a series of linear ethylene polymers of varying molecular weights, and deriving the linear correlation between the measured low-shear rate viscosity and the measured $M_w$. As noted above, VEF has a value of exactly 1 for a polymer having no long-chain branching. The value of VEF is greater than 1 for polymers having one or more long-chain branches in the ethylene polymer backbone. Preferably, $\eta^*$ is measured at 190° C. and 0.025 rad/sec. In a particularly convenient method, K has a value of $2.1 \times 10^{-14}$ and x=3.66.

The method is especially valuable for detecting long-chain branching in ethylene polymers having weight-average molecular weights greater than 100,000. At such high molecular weights, it becomes too difficult to accurately estimate the zero-shear viscosity, $\eta_o$, and to estimate long-chain branching using conventional methods. By combining rheology information with readily available $M_w$ data from gel permeation chromatography, we developed a relatively simple way to estimate long-chain branching content for even high-molecular-weight ethylene polymers.

The following examples merely illustrate the invention. Those skilled in the art will recognize many variations that are within the spirit of the invention and scope of the claims.

EXAMPLE 1

Ziegler-Natta Catalyst Preparation

A polysiloxane-supported Ziegler-Natta catalyst is prepared generally as described in U.S. Pat. No. 4,464,518. Thus, n-butylmagnesium chloride and trimethylsilyl-terminated methylhydropolysiloxane are reacted in tetrahydrofuran, and the product (A) is diluted with toluene. Separately, 1-hexanol and cyclohexanol are carefully reacted in toluene with diethylaluminum chloride to give product (B). Products (A) and (B) are then combined to produce (C), which is combined with titanium tetrachloride and worked up in the usual way to give (D), the polysiloxane-supported titanium pre-catalyst. Combination of (D) with triethylaluminum as described previously gives the polysiloxane-supported Ziegler-Natta catalyst.

EXAMPLE 2

Preparation of Open-Architecture Indeno[1,2-b]indolyl Titanium Complex 5

The method of U.S. Pat. No. 6,818,713, Example 2 is used to prepare complex 5, which has the structure shown below:

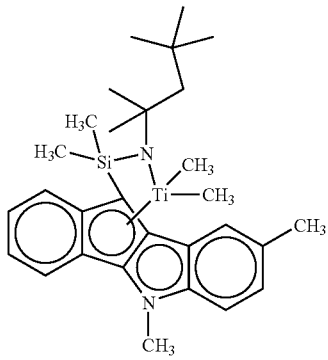

COMPARATIVE EXAMPLE 3

Preparation of Carbon-bridged Bis(indeno[2,1-b]indolyl) Zirconium Complex 6

The method of U.S. Pat. No. 6,933,353, Example 1 is used to prepare complex 6, which has the structure shown below:

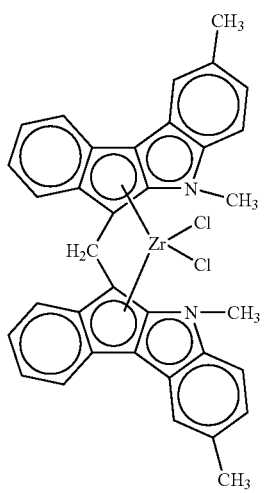

EXAMPLE 4

Preparation of Mao-Treated Silica

In a glove box at room temperature, anhydrous toluene (40 mL) is added to calcined silica (CARiACT G-3 silica, product of Fuji Silysia Chemical, Ltd., calcined at 200° C. for 6 h prior to use, 8.0 g). Methylalumoxane (14.2 mL of 30 wt. % MAO in toluene, product of Albemarle) is slowly added to the magnetically stirred silica slurry. After stirring for 0.5 h at room temperature, the mixture is heated to 80° C. for 2 h using an external oil bath. After cooling to ambient temperature, toluene is removed under vacuum to provide MAO-treated silica (13.8 g).

EXAMPLE 5

Silica-Supported Complex 5

In a glove box at room temperature, anhydrous toluene (1.0 mL) is added to methylalumoxane solution (0.48 mL of 30 wt. % MAO in toluene). Complex 5 (0.025 g, 0.049 mmol) is added to the diluted MAO solution. After stirring for 0.5 h at room temperature, a sample of the MAO-treated silica prepared above (0.51 g) is added, and stirring continues for 1 h at room temperature. Toluene is removed under vacuum at room temperature to provide a brown powder, which is washed with hexane and redried under vacuum to give silica-supported complex 5 (0.62 g).

COMPARATIVE EXAMPLE 6

Silica-Supported Complex 6

The procedure of Example 5 is repeated, except that complex 6 (0.032 g, 0.049 mmol) is used instead of complex 5.

EXAMPLE 7

Polymerization of Ethylene Using Supported Complex 5

A one-liter, stainless-steel reactor is charged with 1-butene (5 mL) and hydrogen (35 psi pressure drop from an in-line, 10-mL hydrogen cylinder). Triisobutylaluminum (0.5 mL of a 1.0 M solution in heptane, 0.5 mmol) and Armostat 710 fatty amine (product of Akzo Nobel, 1 mg in 0.25 mL solution in heptane) are mixed in one sidearm of the injector. This mixture is then flushed into the reactor with nitrogen pressure and isobutane (about 400 mL). The reactor is then pressurized with ethylene to 310 psig. The reactor contents are allowed to equilibrate at 80° C. Silica-supported complex 5 is charged into the other injector arm and is then flushed into the reactor with isobutane (90 mL) and nitrogen pressure. After the polymerization is complete, the reactor is vented and the product is collected and dried in a vacuum oven. The experiment is then repeated, and the polymer resin collected from both runs is combined. The resin ("Polymer B1") has $M_w$=380,000; density=0.915 g/mL; and a relatively low content of long-chain branching (VEF=1.2*).

COMPARATIVE EXAMPLE 8

Polymerization of Ethylene Using Supported Complex 6

The procedure of Example 7 is repeated except that hydrogen is omitted and supported complex 6 is used instead of supported complex 5. The resulting polymer resin ("Polymer B2") has $M_w$=300,000; density=0.921 g/mL; and substantial long-chain branching (VEF=25*).

*Note: the VEF values for Example 7 and Comparative Example 8 were determined at 230° C. using K=1.2×10$^{-14}$.

EXAMPLE 9

Polymerization of Ethylene Using Ziegler-Natta Catalyst

A polysiloxane-supported Ziegler-Natta catalyst prepared as in Example 1 is used to polymerize ethylene in the presence of triethylaluminum and cyclohexylmethyldimethoxysilane in a 100-gallon (i.e., pilot-plant scale) stirred-tank reactor to produce a high-density, low-molecular-weight ethylene homopolymer ("Polymer A"). The following conditions are used: reactor temperature: 176° F.; pressure: 129 psig; ethylene flow rate: 32 lbs./h; hexane flow rate: 101 lbs./h; hydrogen to ethylene molar ratio: 4; catalyst slurry flow rate: 42 lb./h; neat catalyst flow rate: 3.5 g/h; neat triethylaluminum flow rate: 11 g/h; cyclohexylmethyldimethoxysilane flow rate: 1.1 g/h; residence time: 2 h. The resulting polyethylene powder is separated from volatile material and is dried. The product, Polymer A, has $MI_2$=180 and density=0.971 g/mL.

EXAMPLE 10

Preparation of Polymer Blends

A Haake MiniLab microcompounder, which has a conical twin-screw compounder and an integrated backflow channel, is used to prepare homogeneous mixtures of Polymer A and either of Polymers B1 or B2. The blend compositions are chosen to target a final density of 0.948 g/mL. Table 1, below, shows the resulting blend compositions and densities.

TABLE 1

Polymer Blend Compositions and Densities

| | Weight ratio (g A/g B1 or B2) | Target density (g/mL) | Actual density (g/mL) |
|---|---|---|---|
| Blend 1 = Polymer A + Polymer B1 | 60:40 | 0.948 | 0.949 |
| Comparative Blend 2 = Polymer A + Polymer B2 | 55:45 | 0.948 | 0.947 |

Characterization and Testing of Polymer Blends

The environmental stress crack resistance (ESCR) of the blends is tested using ASTM D5397. Thus, the blends are compression molded into 75-mil thick plaques and then die-cut into specimens. Specimens are notched and completely immersed in a 50° C. bath containing 10% aqueous Igepal CO-6305 surfactant while being subjected to a tensile stress of 1000 psi. The time to failure (nearest 0.1 h) is recorded. The values reported in Table 1 are average failure times based on analysis of five test specimens.

Polymer density is determined using ASTM D-1505; melt index is determined using ASTM D-1238.

$E_R$ is a measure of polydispersity derived from rheological data of polymer melts. It is affected by characteristics on a molecular level, e.g., molecular weight distribution, the presence and type of branching, molecular entanglement, and other factors. Determination of $E_R$ utilizes frequency response data in the linear viscoelastic region. That is, $E_R$ is derived from the measured dynamic storage modulus, G', and loss modulus, G", as a function of frequency. Details of how to measure and calculate $E_R$ appear elsewhere (see, e.g., Shroff et al., *J. Appl. Polym. Sci.* 57 (1995) 1605; Harrel et al., *J. Appl. Polym. Sci.* 29 (1984) 995; Han et al., *Polym. Eng. Rev.* 2 (1982) 135; and ASTM D 4440-84, entitled "Standard Practice for Rheological Measurement of Polymer Melts Using Dynamic Mechanical Properties").

Data for $E_R$ and the VEF method can be generated using any rheometer capable of measuring dynamic mechanical properties of polymer melts over a wide range of frequencies, such as a Rheometrics Mechanical Spectrometer Model 605 or 705 or Rheometrics/TA Instruments RDA 2 or ARES Analyzer. $E_R$ and VEF values reported herein are determined at 190° C. for frequencies ranging from 0.025 to 398 rad/sec using 25 mm parallel plates and strains between 5-10%. The strain is varied depending on the sample melt index but in all cases is verified to be in the linear viscoelastic region. $E_R$ is computed by fitting ln G' versus ln G" for the nine lowest frequency points to a linear equation and extrapolating to calculate G' at G"=5×10$^3$ dynes/cm$^2$. $E_R$ is then calculated from the equation: $E_R$=(1.781×10$^{-3}$)G' at a value of G"=5×10$^3$ dynes/cm$^2$.

Except as noted earlier for Example 7 and Comparative Example 8, all measurements are conducted at 190° C. using a nitrogen circulating oven. Samples are stabilized by adding approximately 2% of a 50-50 mixture of BHT and Irganox 1010 to the sample during compression molding of the sample disks used for the measurement.

GPC measurements are obtained with a Waters GPC2000CV instrument equipped with a dual angle light scattering detector from Precision Detectors. Samples are dissolved in 1,2,4-trichlorobenzene (TCB) containing BHT (2 g/4 L) at 175° C. for one hour with mixing for 30 minutes. Samples are placed into the GPC sample compartment and analyzed at 145° C. using two mixed bed B LS columns from Polymer Laboratories at a set flow rate of 1.0 mL/min. Sample concentrations are 1.3-1.8 mg/mL with 200 μL injections. Conventional calculations are performed using standard universal calibration curves. Light scattering calculations are done using NIST 1475 as a control sample with a specified $M_w$ of 58,000 and an IV of 1.0.

Table 2 summarizes the results.

TABLE 2

Polymer Blend Properties and Performance

| Blend | $M_w$ | $E_R$ | VEF | ESCR (h to fail) |
|---|---|---|---|---|
| 1 | 230 K | 1.1 | 1.0 | 900 ± 100 |
| C2 | 232 K | 3.9 | 4.6 | 2.2 ± 0.4 |
| L5008* | 342 K | — | — | 730 ± 40 |

*Single resin benchmark; product of Equistar Chemicals, LP.

As the results demonstrate, excellent performance in a pipe application is achieved with a resin blend of the invention. The principal difference between resin blends 1 and C2 is the high-molecular-weight, low-density ethylene copolymer, which is made using an open achitecture indenoindolyl complex for the inventive blend, and with a bridged indenoindolyl complex not having open architecture in the comparative example. The ESCR result from the inventive resin blend exceeds results obtained with a benchmark resin, Equistar's L5008, a commercial resin used for pipe applications.

The examples are meant only as illustrations. The following claims define the invention.

We claim:

1. A blow molded pipe produced from a resin blend comprising from about 30 to about 70 wt. % of a low-molecular-weight, high-density polyethylene, and from about 30 to about 70 wt. % of a high-molecular-weight, low-density ethylene copolymer produced using a bridged indenoindolyl Group 4 metal complex having open architecture, wherein the ethylene copolymer has a weight-average molecular weight within the range of 150,000 to 500,000, wherein the blend has a density from 0.94 to 0.96 g/cm$^3$, a weight-average molecular weight (Mw) by gel permeation chromatography greater than 200,000, rheological polydispersity ($E_R$) of less than 1.5, and a viscosity enhancement factor (VEF), calculated from its melt viscosity ($\eta^*$) at 190° C. and 0.025 radians per second, of less than 2, wherein the pipe exhibits a notched constant tensile (NCTL) value of greater than 500 hours to failure, and wherein the low molecular-weight, high-density polyethylene is produced using a polysiloxane-supplied Ziegler-Natta catalyst.

2. The pipe of claim 1, wherein the resin blend has a high-load melt index ($MI_{20}$) of less than 25.

3. The pipe of claim 1, wherein the low molecular-weight, high-density polyethylene is produced in the presence of a silane modifier.

4. The pipe of claim 3, wherein the silane modifier is a cyclohexyl dialkoxy(alkyl)silane.

5. The pipe of claim 1, wherein the ethylene copolymer has a density of from 0.900 to 0.925 g/cm$^3$.

6. The pipe of claim 1, wherein the ethylene copolymer has little to no long-chain branching content.

7. The pipe of claim 1, wherein the polyethylene has a molecular weight distribution ($M_w/M_a$) of less than 5.

* * * * *